(12) United States Patent
Lu

(10) Patent No.: US 7,158,627 B1
(45) Date of Patent: Jan. 2, 2007

(54) METHOD AND SYSTEM FOR INHIBITING SOFTSWITCH OVERLOAD

(75) Inventor: James J Lu, Plano, TX (US)

(73) Assignee: Sonus Networks, Inc., Chelmsford, MA (US)

( * ) Notice: Subject to any disclaimer, the term of this patent is extended or adjusted under 35 U.S.C. 154(b) by 1147 days.

(21) Appl. No.: 09/821,509

(22) Filed: Mar. 29, 2001

(51) Int. Cl.
*H04M 7/00* (2006.01)
*H04M 3/00* (2006.01)
*H04M 5/00* (2006.01)

(52) U.S. Cl. .................. 379/221.07; 379/279

(58) Field of Classification Search .......... 379/221.07, 379/221.06, 207.02, 100.03, 100.05, 111, 379/112.01, 112.05, 112.06, 112.1, 279; 709/223, 709/224
See application file for complete search history.

(56) References Cited

U.S. PATENT DOCUMENTS

| | | | | |
|---|---|---|---|---|
| 5,933,490 A * | 8/1999 | White et al. | ........... | 379/221.01 |
| 6,301,609 B1 * | 10/2001 | Aravamudan et al. | ...... | 709/207 |
| 6,633,539 B1 * | 10/2003 | Basso et al. | ................. | 370/229 |
| 6,650,731 B1 * | 11/2003 | Steltner et al. | .......... | 379/15.01 |
| 6,650,748 B1 * | 11/2003 | Edwards et al. | ........ | 379/266.04 |

* cited by examiner

*Primary Examiner*—Benny Q. Tieu
(74) *Attorney, Agent, or Firm*—Proskauer Rose LLP

(57) ABSTRACT

A method includes receiving, at a softswitch executing on a computer, a plurality of calls for switching, monitoring at least one criteria associated with operation of the computer, and based on the monitoring, limiting the number of calls processed by the computer.

20 Claims, 3 Drawing Sheets

METHOD AND SYSTEM FOR INHIBITING SOFTSWITCH OVERLOAD

TECHNICAL FIELD OF THE INVENTION

This invention relates generally to telecommunications and more particularly to a method and system for inhibiting softswitch overload.

BACKGROUND OF THE INVENTION

Telecommunications is becoming increasingly important in today's society. Telecommunications systems allow persons located at great distances to communicate with one another. Telephone calls require a connection between the telephones used by the persons involved in the call. Such connections were traditionally formed by creating a physical connection by physically closing a plurality of switches to complete a circuit between the two telephones. More recently, physical switches have been replaced with computer software referred to as a "softswitch." Softswitches perform necessary switching of telephone calls through software, thereby creating the required circuit.

One problem affecting softswitches is a potential for memory overload. Memory overload refers to the consumption of too much of a computer system's memory capacity. If too much memory is utilized, memory corruption may occur, resulting in a core dump. Another potential problem with softswitches is the potential for central processing unit overload. This may occur when too much of the processing capability of the associated processor is utilized. Symptoms of such a problem include irregular "timeout" situations. In such a "timeout," the processor is unable to execute instructions or process calls.

SUMMARY OF THE INVENTION

Therefore, a need has arisen for a method and system for inhibiting softswitch overload. The present invention provides a method and system for inhibiting softswitch overload that addresses disadvantages of prior systems and methods.

According to one embodiment of the invention, a method for call processing includes receiving at a softswitch executing on a computer a plurality of calls for switching, monitoring at least one criteria associated with operation of the computer, and based on the monitoring, limiting the number of calls processed by the computer.

According to another embodiment of the invention, a system for call processing includes a computer having a processor and an associated memory. The system also includes a softswitch operating on the computer for processing calls and program code stored on the memory and operable to monitor at least one criteria associated with the operation of the computer. In response to determining that at least one criteria exceeds an acceptable level, the program code limits additional calls processed by the softswitch until the at least one criteria reaches a desired level.

According to yet another embodiment of the invention, a method for call processing includes receiving at a softswitch executing on a computer a plurality of calls. The computer has a processor and an associated memory. The method also includes monitoring a plurality of criteria associated with operation of the computer. The plurality of criteria includes the amount of usage of the processor, the amount of usage of the memory, and the number of calls being processed by the softswitch. In response to determining that one of the plurality of criteria exceeds an acceptable level, additional calls are blocked from being processed by the softswitch until the criteria that exceeded an acceptable level reaches an acceptable return level.

Some embodiments of the invention provide numerous technical advantages. Other embodiments may realize some, none, or all of these advantages. For example, according to one embodiment, a method and system are provided that may prevent softswitch overload by monitoring relevant parameters of operation of the softswitch and its associated computer. Upon detection of potentially dangerous conditions, such as those that indicate overload is imminent, remedial action, such as refusing additional calls for processing, may be effected to avoid overload. Such a system and method results in a more reliable softswitch and therefore more reliable telecommunications service for customers.

Other advantages may be readily ascertainable by those skilled in the art and the following FIGURES, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which.

DETAILED DESCRIPTION OF EXAMPLE EMBODIMENTS THE INVENTION

Example embodiments of the invention and its advantages are best understood by referring to FIGS. 1 through 5 of the drawings, like numerals being used for like and corresponding parts of the various drawings.

Figure 1:
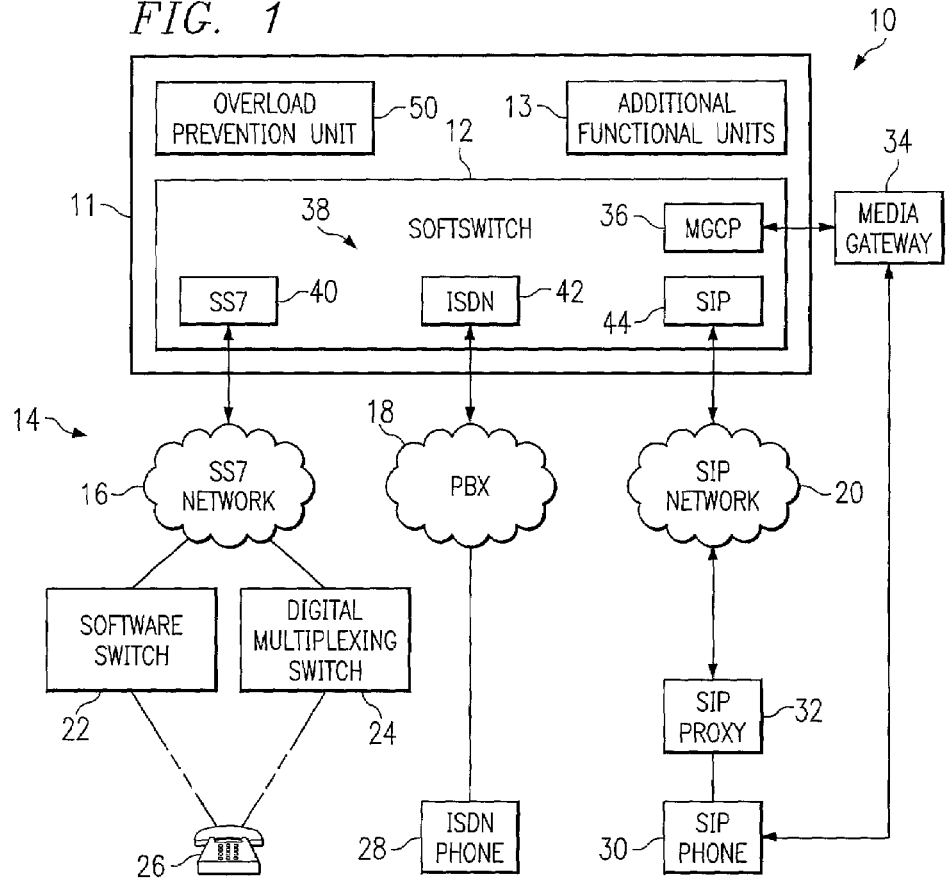
FIG. 1 is a block diagram of a telecommunications system utilizing a softswitch according to the teachings of the invention.

FIG. 1 is a block diagram of a telecommunications network 10 according to the teachings of the invention. Telecommunications network 10 includes a softswitch 12. Softswitch 12 provides necessary routing of telephone calls through software and may be designed to accommodate any desired type of telecommunications signal.

As illustrated, softswitch 12 is implemented on a computer 11. Physical components of computer 11 are described in greater detail below in conjunction with FIG. 2A. Also implemented on computer 11 is an overload prevention unit 50 and additional functional units 13. According to the teachings of the invention, overload prevention unit 50 monitors criteria associated with operation of computer 11 and softswitch 12 to prevent overload. Upon detection of a potentially hazardous condition by overload prevention unit 50, remedial action is effected, which may include halting processing of additional calls by softswitch 12.

As illustrated in FIG. 1, softswitch 12 receives signals from three types of telecommunications networks 14. These telecommunications networks 14 include, in this example, an SS7 network 16, a Public Branch Exchange 18, and a SIP network 20; however other telecommunications networks may also benefit from the teachings of the invention. Associated with SS7 Network 16 are software switch 22 and digital multiplexing switch 24, for example. Software switch 22 and digital multiplexing switch 24 allow switching of telephone calls placed by traditional telephones 26. ISDN phones 28 are associated with public branch exchange 18, and SIP phones 30 are associated with SIP network 20. An SIP proxy 32 serves as an intermediary between SIP network 20 and SIP phone 30.

Also associated with SIP network 20 is a media gateway 34. Media gateway 34 supports transmission of the actual voice or data signal between SIP network 20 and softswitch 12 as opposed to the signaling associated with such transmissions. A MGCP 36, which stands for media Gateway Control Protocol, controls the signaling associated with such transmissions.

Associated with each type of telecommunications network 14 is a corresponding signaling subsystem 38. Signaling subsystems 38, in this example, include an SS7 signaling subsystem 40, an ISDN signaling subsystem 42, and a SIP signaling subsystem 44. In this illustration, signaling subsystems 38 represent the signaling subsystem functional units of softswitch 12.

Additional functional units 13 on computer 11 may include additional functional capability associated with telephony, or any other desired function, that may be useful to implement on the same computer 11 as softswitch 12. For example, additional functional units 13 may include provisioning capability for providing telephony service for customers.

In operation, a telephone call, such as a telephone call initiated by telephone 26, is directed by software switches 22 or digital multiplexing switches 24 to SS7 network 16 for receipt by SS7 signaling subsystem 40 of softswitch 12. Softswitch 12 appropriately directs the call through one of the telecommunications networks 14 for receipt by the called party. Such calls are directed to and through the appropriate network by invoking necessary switching such that the called party may receive the telephone call. As illustrated, the called party may reside on the same type of network as telephone 26, or other types of networks 14, such as the public branch exchange 18 or SIP network 20. Such switching utilizes both processor 46 resources and memory 48 on softswitch 12 (FIG. 2).

The invention recognizes that as the volume of calls increases, so does the potential for processor overload and memory overload. Thus, if too many calls are being processed at one time by softswitch 12, processor 46 may be overloaded or memory 48 may be overloaded. According to the teachings of the invention a flow control unit 50 monitors processor and memory usage of computer 11. In response to determining that the processor usage or the memory usage exceeds acceptable levels, flow control unit 50 initiates remedial action. Additionally, the number of calls being processed at one time by softswitch 12 may also be monitored, as described below. As described in greater detail below remedial action may include stopping certain telephone calls to alleviate potential overload concerns.

Figure 2A:
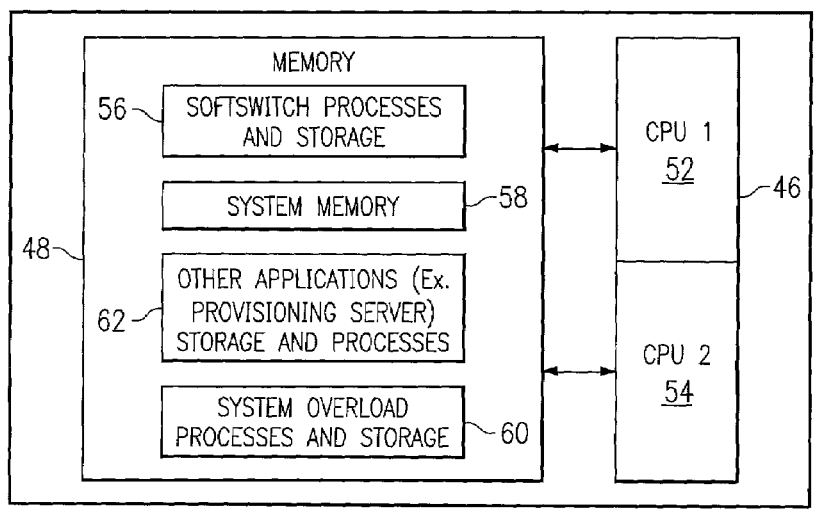
FIG. 2A is a block diagram of the computer of the telecommunications system of FIG. 1, showing system memory and processing units used by the softswitch of FIG. 1.

FIG. 2A is a block diagram of computer 11 showing additional details of the computer. Computer 11 includes a memory 48 and a processor system 46 according to one embodiment of the invention. As illustrated, in one embodiment processing system 46 may comprise dual central processing units 52 and 54; however, the teachings of the invention are applicable to systems utilizing any number of processing units including one, two, or more than two processing units.

Memory unit 48 is depicted as storing certain categories of information for clarity of description; however, it is to be understood that memory storage associated with any particular category of information may not be continuous and may be distributed in any suitable fashion within memory 48 or other external memory. As illustrated, memory unit 48 includes softswitch processes and storage 56, system memory 58, overload prevention unit storage and processes 60, and other applications storage and processes 62.

Softswitch processes and storage refers to portions of memory 48 utilized to store data and programming regarding the operation of softswitch 12, as well as underlying processes to effect such switching. System memory 58 stores data, programming, and processes associated with system operation of the computer system 11. Overload prevention unit processes and storage 60 stores data, and programming, and processes associated with operation of overload prevention unit 50. Memory 48 may store many other types of information, as desired for the application of softswitch 12; however, in this example, other applications storage and processes 62 is depicted, by example, as processes, programming, and data associated with a provisioning server. A provisioning server operates to provision services for individual callers or groups of callers and may, for convenience, reside on computer 11 with softswitch 12.

According to the teachings of the invention, overload prevention unit 50, represented as being stored in overload prevention processes and storage 60, monitors memory 48 and processor system 46 to determine whether processor usage or memory usage exceeds acceptable levels in order to prevent overload of softswitch 12. The number of calls handled by a softswitch is also monitored to detect possible overload of softswitch 12 and computer 11.

Figure 2B:
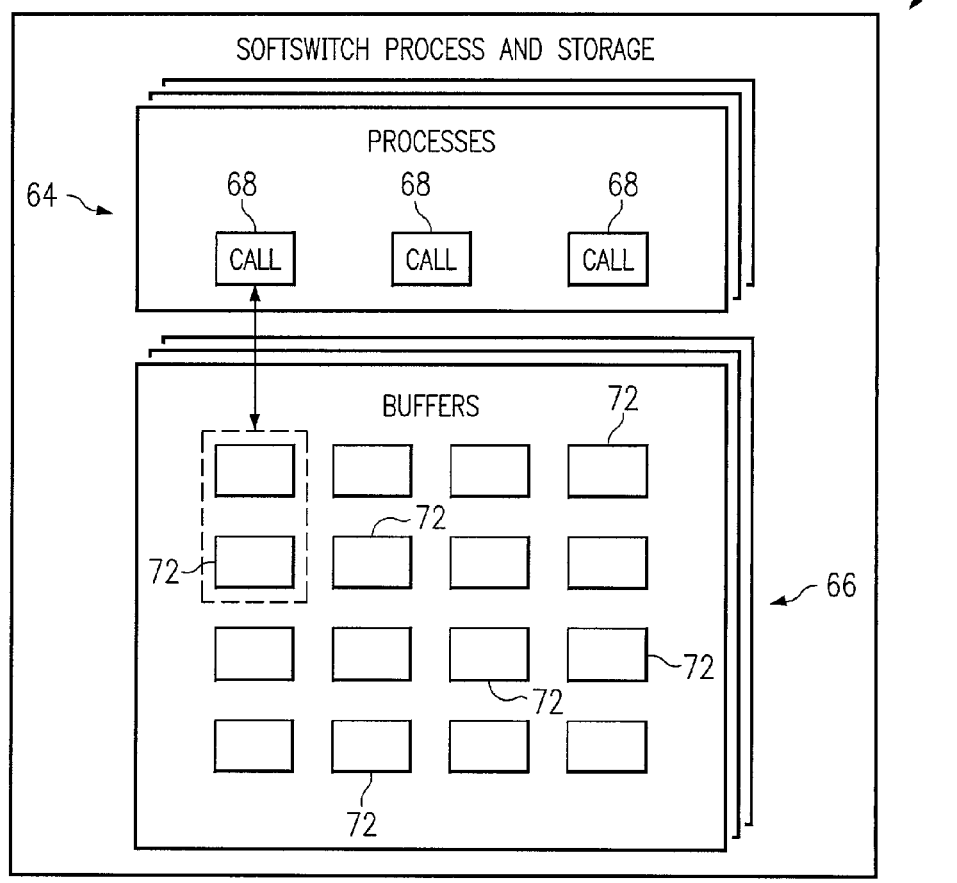
FIG. 2B is a block diagram of a portion of the memory of FIG. 2A, showing processes and buffers utilized by the softswitch of FIG. 1.

FIG. 2B is a block diagram showing additional details of softswitch processes and storage 56. Softswitch processes and storage 56 includes a plurality of processes 64. Each process may be associated with a plurality of calls 68. Softswitch processes and storage 56 also includes a plurality of buffers 66. Each buffer 66 may have a plurality of associated memory locations 72. In one implementation, one call 68 may consume two memory locations 72; however, other implementations may require more or less memory locations associated with each call 68. Because, in some embodiments, the amount of memory usage is related to the number of calls being processed by softswitch 12, as shown in FIG. 2B, the number of calls being processed by the softswitch may be indicative of a potential failure of computer 11. Thus, the number of calls being processed by the softswitch may also be monitored to prevent overload.

Figure 3:
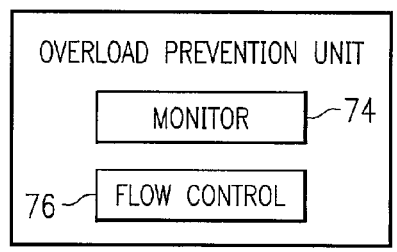
FIG. 3 is a block diagram of the overload prevention unit of FIG. 1 showing additional details of the unit.

FIG. 3 is a block diagram of overload prevention unit 50, showing additional details of the unit. Overload and prevention unit 50 includes a monitoring unit 74 and a flow control unit 76. As described in greater detail below, monitoring unit 74 monitors the usage of processor system 46 and the usage of memory 48. In response to determining that the usage of processor 46 or memory 48 exceeds acceptable levels, flow control unit 76 is initiated for remedial action. Flow charts showing the operation of one embodiment of monitoring unit 74 and flow control unit 76 are described below in connection with FIGS. 4 and 5.

Figure 4:
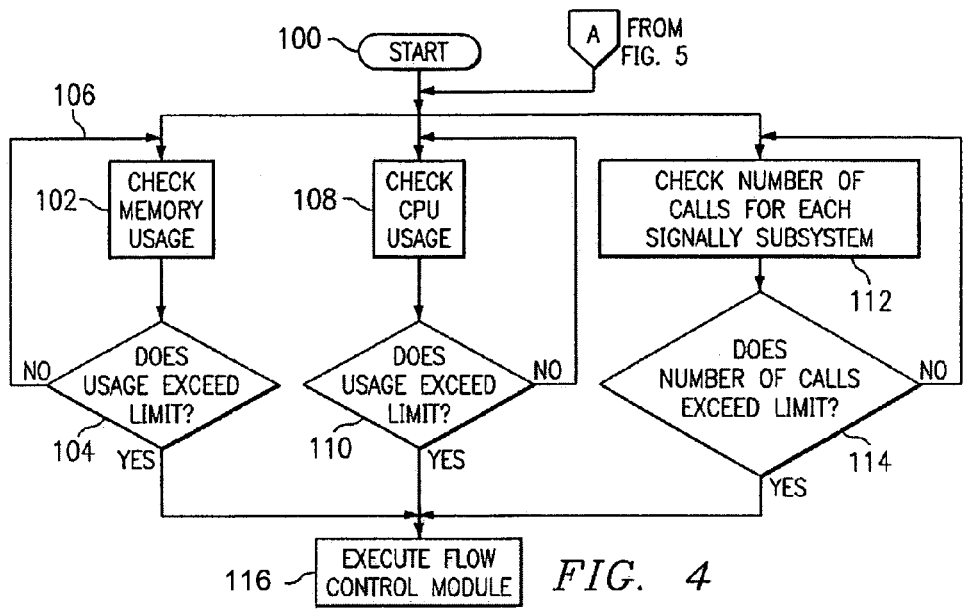
FIG. 4 is a flowchart showing example steps associated with the monitoring function of the overload prevention unit of FIG. 1.

FIG. 4 is a flowchart showing operation of monitoring unit 74 according to the teachings of the invention. According to the teachings of the invention, various checks are made on memory usage, processor usage, as well as the number of outstanding calls for each signaling subsystem 14. These checks may be made substantially concurrently or may be made in any suitable serial fashion.

Processing begins at step 100. At a step 102 memory usage is checked. According to one embodiment, memory usage is checked using a kernal function called "SYSINFO." This function call is a UNIX kernal call that provides the amount of memory used on a computer. In this example, the amount of memory used may be the amount of memory used for all applications operating on computer system 11. Alternatively, the amount of memory used by softswitch 12 may be monitored. At a step 104 a determination is made by monitoring unit 74 whether the usage level exceeds acceptable limits. According to one embodiment of the invention, if the usage level exceeds approximately 80 to 85 percent of the total memory available, this is considered to exceed acceptable limits; however, any suitable memory usage level may be used as an acceptable limit. If the usage limit is not exceeded, step 102 is repeated periodically, as illustrated by reference numeral 106; however, if the usage level determined at 104 exceeds appropriate limits, flow control unit 76 is executed to provide remedial action. Such remedial action is described in greater detail in conjunction with FIG. 5.

In addition to monitoring memory usage, according to one embodiment the processor usage is also monitored. At a step 108 the usage of processor system 46 is checked. This may occur, in one example, by separate checks of the processor usage of processor 52 and processor 54. One method for implementing such a check of processor usage is the UNIX shell command "VMSTAT", offered by Sun Microsystems. This UNIX shell command determines and provides the processor usage periodically. According to one embodiment of the invention, it has been determined that checking approximately every ten seconds is desirable; however, other intervals may be utilitized. Thus the amount of processor usage may be implemented by using a time interval option of the shell command VMSTAT. At step 110 a determination is made of whether the processor usage exceeds acceptable limits. This determination may be made for either processor 52 or 54, or both. Any desired limit may be used; however, according to one embodiment of the invention it has been determined that when the processor usage exceeds 90–95% of capacity that remedial action should be taken. Thus, at step 110 if the usage limit is exceeded, flow control module 76 is executed at step 116. If the usage limit is not exceeded, CPU usage is checked periodically at step 108.

In the above example, dual processors 52 and 54 were utilized. In such a case, remedial action may occur when either of the two processors exceeds a desired acceptable limit. Alternatively, remedial action could be effected only when both processors exceed the acceptable limits. The second approach may be more desirable if processor system 46 is designed to allocate processor requirements to the processor that is less utilized. In addition, the average usage of the two processors 52 and 54 may be used to determine whether remedial action is effected. The teachings of the invention are also applicable to systems utilizing only one processor or processor systems having two or more processors.

In addition to checking the memory usage at step 102 and the processor usage at step 108, the number of outstanding calls for each signaling subsystem may be monitored as an indication of potential softswitch overload. At step 112, the number of outstanding calls for each signaling subsystem is determined. This step may be performed in a variety of ways; however, according to one embodiment, a counter is maintained for each signaling subsystem. Whenever a call is placed a counter is incremented and is not decremented until the call is terminated. At a step 114, a comparison is made, for each signaling subsystem, between the number of calls outstanding and the number of calls for each subsystem that may take place. As illustrated in FIG. 2B, each call is associated with a particular number of buffers, which results in the limitation on the number of calls when the available buffers for each signaling subsystem are used. Typically, an established call 68 uses two of the buffers 72 in softswitch storage 66. One buffer is used for the originating leg and one for the terminating leg. According to one embodiment, when the number of calls, whether in a connecting, established or disconnecting stage, exceeds 50% of the maximum capacity of buffers, this is considered excessive and flow control module 116 is executed. If the number of calls at step 114 is not exceeded, then step 112 is periodically executed.

Thus, according to the teachings of the invention one, more than one, or all, of a number of parameters are monitored and compared to acceptable levels. If one, two, or all of these levels are exceeded, remedial action may take place. In particular, according to one embodiment remedial action may occur if any one of memory usage, processor usage, or the number of calls for each signaling subsystem is exceeded. However, in other embodiments, flow control may be effected only if a combination of two or more of these criteria are met.

Figure 5:
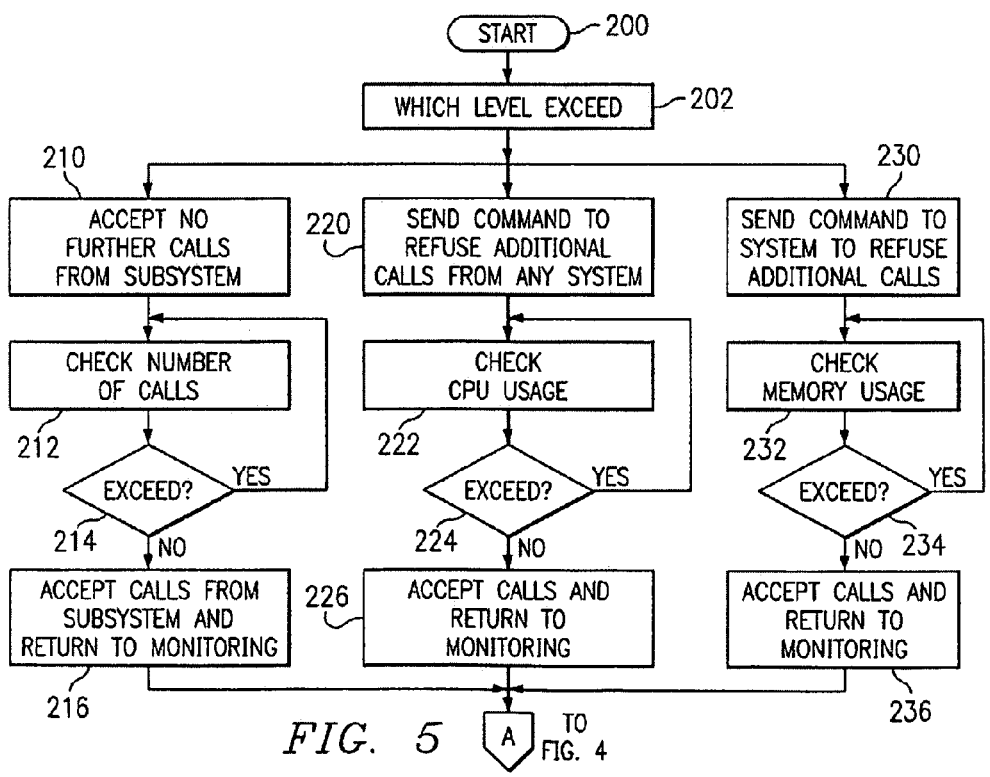
FIG. 5 is a flowchart showing example steps associated with the operation of the flow control module of overload prevention unit of FIG. 1.

FIG. 5 is a flowchart showing example steps associated with execution of flow control module 76 to provide remedial action in response to a determination by monitoring unit 74 that a relevant usage level has been exceeded. The process begins at step 200. At step 202, a determination is made of what usage level was exceeded during the monitoring process described above in conjunction with FIG. 4. If the number of calls in any particular subsystem was exceeded, processing continues at step 210. If processor usage was exceeded, processing continues at step 220. If a memory usage was exceeded, processing continues at step 230.

If processing continues at step 210, meaning that the number of allowable calls for any subsystem was exceeded, no further calls are accepted by the subsystem. At step 212, the number of outstanding calls for the subsystem is redetermined. This may be performed in the same manner as step 114 associated with call monitoring by monitoring unit 74. At step 214 a determination is made of whether a return level is exceeded. The return level is the level at which the normal monitoring will continue and calls will again be accepted. This level is less than the acceptable level associated with step 114, which determines when calls will be stopped. The two levels differ to prevent "ping-ponging" between monitoring and flow control. Thus, for some period of time, no calls will be accepted until a return level of calls is achieved. If the return level is exceeded, monitoring continues at step 212. However, if flow control is not exceeded, processing continues at step 216. At step 216, calls are again accepted from the subsystem and monitoring continues at step 100, as described above in conjunction with FIG. 4.

If flow control was executed due to excessive processor usage, processing proceeds at step 220. At step 220, additional calls from any subsystem are refused. At step 222, the processor usage is checked. This processor usage check may occur in the same manner as described above in conjunction with FIG. 4. At step 224, a determination is made whether a return level is exceeded. If the return level is exceeded, monitoring continues within this flow control at step 222. If the return level is not exceeded, then the processor usage has dropped to an acceptable level and calls are again accepted at step 226. In addition, at step 226 monitoring continues at step 100 of FIG. 4. Although any acceptable return level may be used, it has been determined that in the embodiment where calls are prevented after a processor level of 90–95% has been reached, then a return level of 85–90% is particularly useful.

If the flow control process was invoked because of excessive memory usage, then processing continues at step 230. At step 230 additional calls to any subsystem are refused. At step 232, memory usage is again checked. This memory check may be performed in the same manner as described above in conjunction with FIG. 4. At step 234, the memory usage is compared to a return memory level. If the return memory level is exceeded monitoring continues and no additional calls are accepted. If however, the return level is not exceeded, calls are accepted at step 236 and monitoring continues at FIG. 4. According to one embodiment, if calls were prevented due to a memory usage in the range of 80–85%, calls would be reinstated due to a memory level of approximately 75–80%; however, other suitable levels may be utilized.

Thus, according to the teachings of the invention, a system and method are provided that inhibit softswitch overload.

Although the present invention has been described with several example embodiments, various changes and modifications may be suggested to one skilled in the art. It is intended that the present invention encompass those changes and modifications as they fall within the scope of the claims.

The invention claimed is:

1. A method of call processing comprising:
receiving, at a softswitch executing on a computer, a plurality of calls for switching, wherein the computer includes a processing system and a memory, and the softswitch has a plurality of signaling subsystems;
monitoring at least one criterion associated with operation of the computer, wherein the at least one criterion comprises the amount of usage of at least a portion of the processing system, the amount of usage of the memory, the number of the plurality of calls that are being processed by each of the plurality of subsystems, or any combination thereof; and
based on the monitoring, limiting the number of calls processed by the computer.

2. The method of claim 1, and further comprising limiting the number of calls in response to determining that the amount of usage of the memory exceeds approximately 80–85% of the capacity of the memory.

3. The method of claim 1, and further comprising limiting the number of calls in response to determining the amount of usage of the processor exceeds approximately 90–95% of the amount of the processor.

4. The method of claim 1, and further comprising limiting the number of calls processed by the computer in response to determining that the number of the plurality of calls being processed by the computer exceeds approximately 50% of capacity of buffers of the softswitch for processing calls.

5. The method of claim 1, wherein limiting the number of calls processed by the computer comprises accepting no additional calls processed by the computer.

6. The method of claim 1, wherein limiting the number of calls processed by the computer comprises limiting the number of calls processed by the computer until the at least one criterion associated with operation of the computer reaches an acceptable level.

7. The method of claim 6, wherein limiting the number of calls comprises accepting no additional calls until the at least one criterion associated with operation of the computer reaches an acceptable level.

8. The method of claim 7, wherein the acceptable level is an amount of usage of the memory that is 75–80% of the capacity of the memory.

9. The method of claim 7, wherein the acceptable level is the amount of usage of the processor that is 90% of the capacity of the processor.

10. A system for call processing comprising:
a computer having a processor and an associated memory;
a softswitch operating on the computer for processing calls; and
program code stored on the memory and operable to:
monitor at least one criterion associated with the operation of the computer; and
in response to determining that at least one criterion exceeds an acceptable level, limit additional calls processed by the softswitch until the at least one criterion reaches a desired level, wherein the at least one criterion comprises the amount of usage of the processor, the amount of usage of the memory, the number of calls processed by the softswitch, or any combination thereof.

11. The system of claim 10, wherein the softswitch comprises a plurality of signaling subsystems and wherein the at least one criterion comprises the number of calls processed by at least one of the plurality of signaling subsystems at any given time.

12. The system of claim 10, wherein the program code is operable to limit additional calls in response to a determination that the amount of usage of the processor exceeds 90–95% of the capacity of the processor.

13. The system of claim 10, wherein the program code is operable to limit additional calls in response to a determination that the amount of usage of the memory exceeds 80–85% of the capacity of the memory.

14. A system for call processing comprising:
a computer adapted to receive one or more calls, the computer including:
a central processing system;
a memory in communication with the central processing system;
a softswitch module operating on the computer and adapted to perform processing operations on the one or more calls; and
an overload prevention module adapted to monitor at least one criterion associated with operation of the computer and limit the number of calls processed by the computer based on the monitoring,
wherein the criterion comprises the amount of usage of at least a portion of the processing system, the amount of usage of the memory, the number of calls processed by the softswitch, or any combination thereof.

15. The system of claim 14, wherein the overload prevention module is adapted to block additional calls from being processed by the computer in response to a determination that the criterion exceeds an acceptable level.

16. The system of claim 15, wherein the criterion is usage of the memory and the acceptable level is 80–85% of the capacity of the memory.

17. The system of claim 15, wherein the criterion is usage of at least a portion of the processing system and the acceptable level is 90–95% of the capacity of the processing system.

18. The system of claim 14, wherein the overload prevention module is adapted to permit processing of additional calls in response to a determination that the criterion reaches an acceptable return level.

19. The system of claim 18, wherein the criterion is usage of the memory and the acceptable return level is 75–80% of the capacity of the memory.

20. The system of claim 18, wherein the criterion is usage of at least a portion of the processing system and the acceptable return level is 85–90% of the capacity of the processing system.

* * * * *